United States Patent
Hazan

(10) Patent No.: US 9,232,278 B2
(45) Date of Patent: Jan. 5, 2016

(54) VIRTUAL CONTENT SHARING

(71) Applicant: Cisco Technology Inc., San Jose, CA (US)

(72) Inventor: Avi Hazan, Elad (IL)

(73) Assignee: Cisco Technology Inc., San Jose, CA (US)

( * ) Notice: Subject to any disclaimer, the term of this patent is extended or adjusted under 35 U.S.C. 154(b) by 259 days.

(21) Appl. No.: 14/023,631

(22) Filed: Sep. 11, 2013

(65) Prior Publication Data

US 2015/0074727 A1     Mar. 12, 2015

(51) Int. Cl.

| G06F 17/30 | (2006.01) |
|---|---|
| H04N 21/482 | (2011.01) |
| H04N 21/231 | (2011.01) |
| H04N 21/266 | (2011.01) |
| H04N 21/472 | (2011.01) |

(52) U.S. Cl.
CPC .......... *H04N 21/482* (2013.01); *G06F 17/3002* (2013.01); *H04N 21/23109* (2013.01); *H04N 21/26603* (2013.01); *H04N 21/472* (2013.01)

(58) Field of Classification Search
None
See application file for complete search history.

(56) References Cited

U.S. PATENT DOCUMENTS

| 7,698,467 | B2 | 4/2010 | Kim et al. |
| 8,056,109 | B2 | 11/2011 | Kim et al. |
| 2001/0034733 | A1* | 10/2001 | Prompt et al. ................. 707/102 |
| 2013/0055303 | A1 | 2/2013 | Kannan et al. |

OTHER PUBLICATIONS

"Technical Overevew" (Digital Living Network Alliance 2013); available at http://www.dlna.org/dlna-for-industry/digital-living/how-it-works/technical-overview.

* cited by examiner

*Primary Examiner* — Belix M Ortiz Ditren
(74) *Attorney, Agent, or Firm* — Hahn Loeser & Parks LLP

(57) ABSTRACT

A method for providing DLNA compatible content directory service (CDS) on a media content server device includes: entering content item metadata properties into a virtual properties database, where each of the content item metadata properties is associated with a content item stored in a content database; adding the associated content item to CDS sharing as a virtual content item defined by the entered content item metadata properties; in response to a user's request, displaying on a display device the virtual content item in a listing of content information based at least on the content item metadata properties, without accessing the content database; enabling the user to select the virtual content item from the listing; and playing the associated content item from the content database.

11 Claims, 8 Drawing Sheets

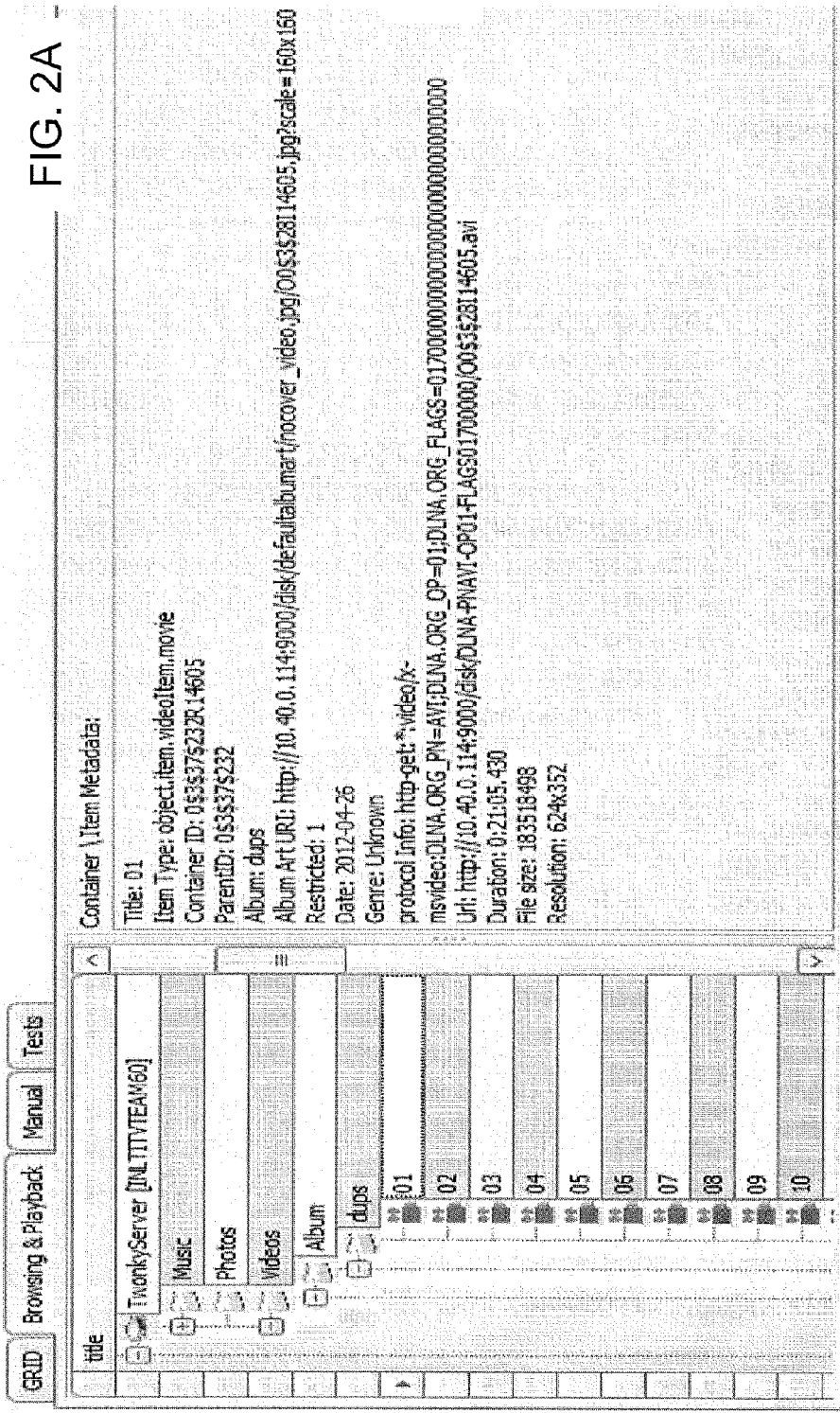

VIRTUAL CONTENT SHARING

FIELD OF THE INVENTION

The present invention relates in general to metadata retrieval services for content sharing, and particularly, but not exclusively, to virtual content directory services (VCDS) in a DLNA (Digital Network Living Alliance) environment.

BACKGROUND OF THE INVENTION

The following reference is believed to represent the state of the art:
http://www.dlna.org/dlna-for-industry/digital-living/how-it-works/technical-overview

SUMMARY OF THE INVENTION

The present invention, in certain embodiments thereof, seeks to provide an improved method for providing DLNA compatible content directory service (CDS) on a media content server device.

There is thus provided in accordance with an embodiment of the present invention a method for providing DLNA compatible content directory service (CDS) on a media content server device, the method including: entering content item metadata properties into a virtual properties database, where each of the content item metadata properties is associated with a content item stored in a content database; adding the associated content item to CDS sharing as a virtual content item defined by the entered content item metadata properties; in response to a user's request, displaying on a display device the virtual content item in a listing of content information based at least on the content item metadata properties, without accessing the content database; enabling the user to select the virtual content item from the listing; and playing the associated content item from the content database.

Further, in accordance with an embodiment of the present invention, the listing of content information is requested via a set-top box (STB); and the content database is on a companion device in communication with the STB.

Still further, in accordance with an embodiment of the present invention, the listing of content information is requested via a first STB; and the content database is on a second STB in communication with the first STB.

Additionally, in accordance with an embodiment of the present invention, the entering is performed autonomously without user input.

Moreover, in accordance with an embodiment of the present invention, the entering includes enabling user input of the metadata properties.

Further, in accordance with an embodiment of the present invention, the associated content item does not include the metadata properties entered via the user input.

Still further, in accordance with an embodiment of the present invention, the method also includes: detecting changes in the content database; and autonomously updating the properties database in response to the detecting.

Additionally, in accordance with an embodiment of the present invention, the method also includes: defining a superset of metadata properties to be used for the entering, where the superset of metadata properties includes metadata properties supported by more than one commercially available CDS product.

Moreover, in accordance with an embodiment of the present invention, the entering includes: accessing a second virtual properties database associated with a second content database associated with a second media content player device; and entering the content item metadata properties into the virtual properties database, where each of the entered content item metadata properties is associated with a content item stored in the second content database.

There is also provided in accordance with an embodiment of the present invention, a DLNA compatible content directory service (CDS) unit for a media content player device, the unit including: means for entering content item metadata properties into a virtual properties database, where each of the content item metadata properties is associated with a content item stored in a content database; means for adding the associated content item to CDS sharing as a virtual content item defined by the entered content item metadata properties; means for enabling a user to display the virtual content item in a listing of content information based at least on the content item metadata properties, without accessing the content database; means for enabling the user to select the virtual content item from the listing; and means for playing the associated content item from the content database.

Further, in accordance with an embodiment of the present invention, the means for entering include: means for accessing a second the virtual properties database associated with a second the content database associated with a second the media content player device; and means for entering the content item metadata properties into the virtual properties database, where each of the entered content item metadata properties is associated with a the content item stored in the second content database.

BRIEF DESCRIPTION OF THE DRAWINGS

The present invention will be understood and appreciated more fully from the following detailed description, taken in conjunction with the drawings in which:

FIGS. 2A-E are screenshots of exemplary representations of output from the system of FIG. 1;

DETAILED DESCRIPTION OF AN EMBODIMENT

The Digital Living Network Alliance (DLNA) is a collaborative trade organization that defines interoperability guidelines to enable sharing of digital media between multimedia devices. DLNA digital media servers (DMSs) manage digital media content and make it available to be played by DLNA digital media players (DMPs).

A DMS is typically associated with a content storage device on which the media content is physically stored. In order to present media content available for viewing on a DMP, the DMP sends a content directory service (CDS) request to a DMS which then sends details of the properties of the media content in its associated content storage device. The properties are based on metadata read from either the files in the content storage device at the time of the request, or from a cache that was populated based on a previous read of the files in the content storage device. In either case, the actual media files are read at least once to provide the metadata.

It will be appreciated that DLNA guidelines define some media content properties as required and some as optional. Accordingly, while available DMS products are typically based on the same DLNA standard, the CDS as implemented for such products are not necessarily wholly compatible. For example, currently available DMSs include products such as the PacketVideo Twonky Server, Microsoft Media Center and Allegro Media Server. While each of the CDSs provided by these products may typically support a generally similar set of required media content properties, they may not necessarily support the same optional media content properties. Accordingly, it may not be assumed that any particular given media content prepared for a given DMS product already has all of the metadata used by a different DMS product. It may therefore be necessary to edit some or all of the user content stored in the content storage device in order to facilitate presenting a detailed list of available content for viewing on a given DMP.

It will similarly be appreciated that there may be useful metadata properties that aren't supported by some or all of the available DMS products. For example, DLNA defines <upnp:rating> as an optional property in the VideoItem class indicating a motion picture rating such as those assigned by the Motion Picture Association of America (MPAA). Since support for the property is optional, it may not be assumed that all CDSs will support it. Accordingly, depending on the DMP used to view media content, this rating may not be available prior to attempting to view the content.

Figure 1:
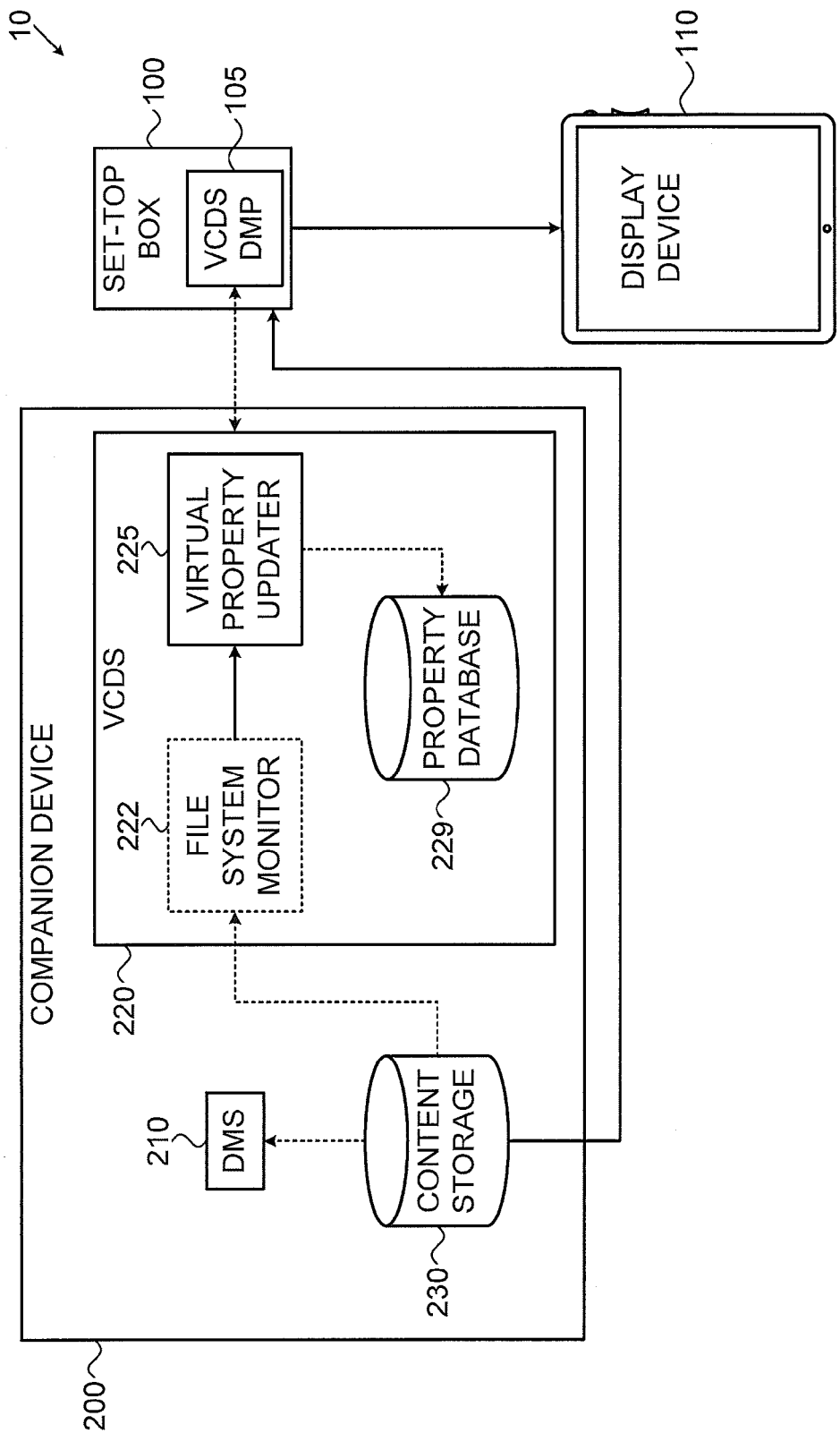
FIG. 1 is a simplified pictorial illustration of a virtual CDS (VCDS) enabled system 10, constructed and operative in accordance with an embodiment of the present invention.

Reference is now made to FIG. 1 which illustrates an exemplary virtual CDS (VCDS) enabled system 10, constructed and operative in accordance with an embodiment of the present invention. System 10 comprises a set-top box 100 in communication with a companion device 200 and a display device 110.

Companion device 200 may be any suitably configured device for the storage and/or playing of media content. For example, companion device 200 may be a personal computer, laptop, smartphone, portable media player or a tablet. As illustrated in FIG. 1, Companion device 200 comprises DMS 210, VCDS 220 and content storage 230. DMS 210 may be any suitable commercially available DMS product such as, for example, Twonky Server, Microsoft Media Center and Allegro Media Server. As will be discussed hereinbelow, DMS 210 may also be implemented via other commercially available DMS products or even proprietary DMS products. The functionality of content storage 230 may be provided by any suitably configured storage device, such as, for example, a computer hard drive, a flash drive or a disk-on-key.

It will be appreciated that companion device 200 may also be configured with a media player module (not shown) for playing media content from at least content storage 230. A user of companion device 200 may use DMS 210 to review and select media content from content storage 230 for playing.

VCDS 220 comprises at least virtual properties updater 225 and property database 229, and is typically implemented as a software module configured to provide content directory services instead of, or in addition to, DMS 210. VCDS 220 may also be implemented as a firmware component of companion device 200. Any suitable means may be used to update propertydatabase 229, such as, for example, virtual propertyupdater 225, which may be implemented as as a software module configured to update propertydatabase 229.

Whereas DMS 210 may typically read metadata directly from media content in order to present it to a user for review, VCDS 220 provides such services "virtually" by maintaining property database 229 with relevant metadata properties for retrieval upon request, without having to read the metadata directly. Virtual propertyupdater 225 may be configured with a user interface (UI) to enable a user to enter the data for database 229 manually, thereby avoiding the need to include the required metadata in an actual media content file in order for it to be used by currently available content directory services. Some or all of the data may also be autonomously "harvested" on a periodic basis from content storage 230 and stored by VCDS 220 for retrieval as needed.

Database 229 can therefore be populated at least in part without actually reading metadata from the media content files, and even if some of the data is actually read from the media content files, it may be done prior to use, thus streamlining the display process. For example, the user may directly enter into database 229 property details such as media content name, genre, video resolution, file name and file location for a given media content item in content storage 230. In such manner, VCDS 220 is also configurable to provide detailed property displays that are generally similar to those that would be provided by DMS 210, as long as the details that are input into VCDS 220 are similar to those available from DMS 210. It will however, be appreciated that VCDS may therefore support properties for media content even if the media content files themselves have not been updated with the relevant metadata.

Accordingly, since VCDS may not have to actually read, parse and/or interpret the actual metadata in order to present viewing options to the user, it may be configurable to flexibly support multiple implementations of CDS. For example, the database may be configured to support a combination of all of the known metadata used by popular DMSs such as Twonky, Microsoft Media Center and Allegro. Accordingly, VCDS 220 may be used instead of, or in parallel with, the CDS of these products.

Set-top box 100 is an exemplary gateway set-top box configured to provide television programming content for display device 110, typically from a television headend via cable, internet and/or satellite. Set-top box 100 comprises a VCDS enabled digital media player (VCDS DMP) 105 configured to access VCDS 220 in order to retrieve property details for the media content stored in content storage 230. Display device 110 may typically be a television configured to receive media content from at least set-top box 100. It will be appreciated that display device 100 may be implemented with any any suitable media display device including, for example, other companion devices similar to companion device 200.

Figure 2B:
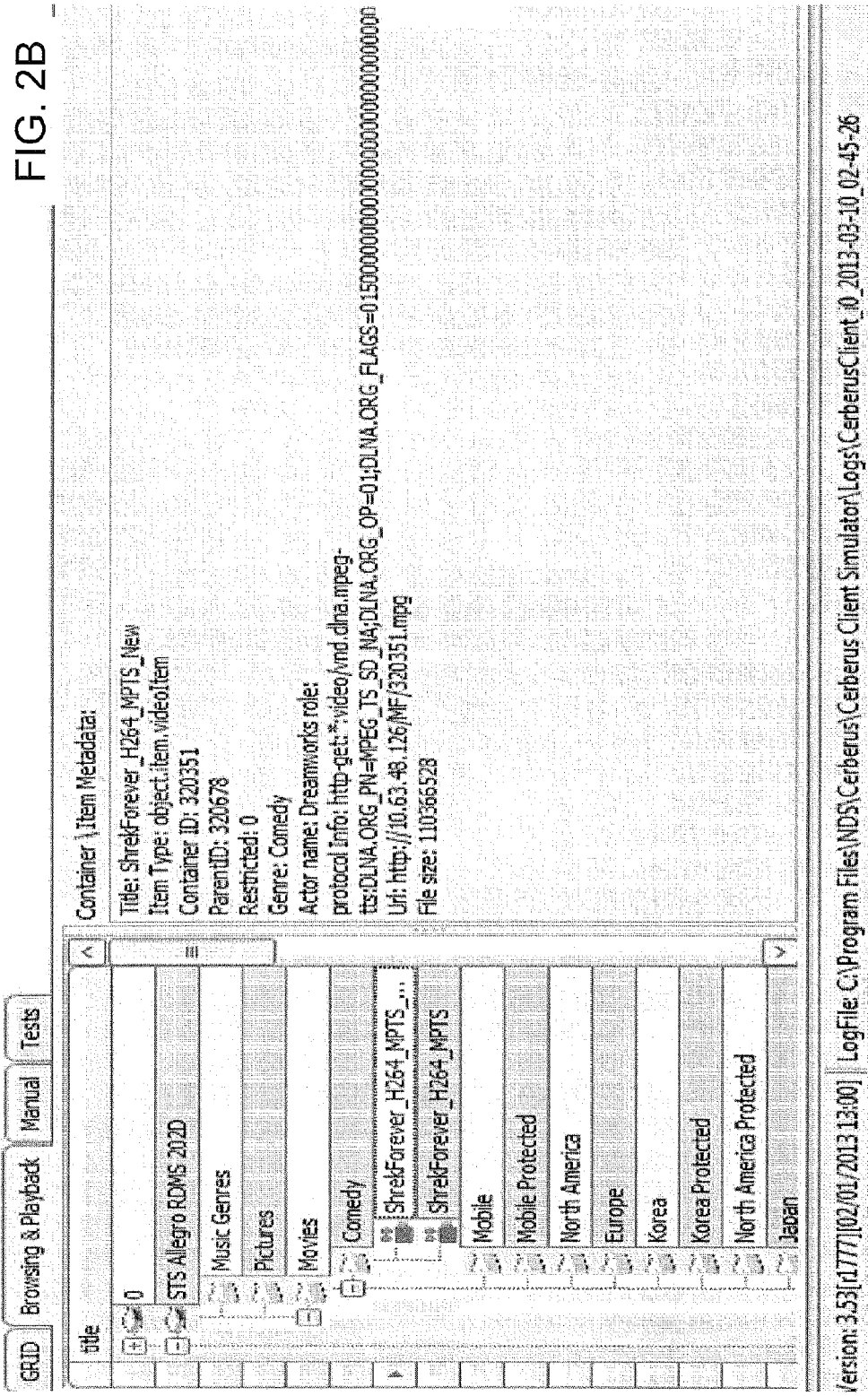
Figure 2C:
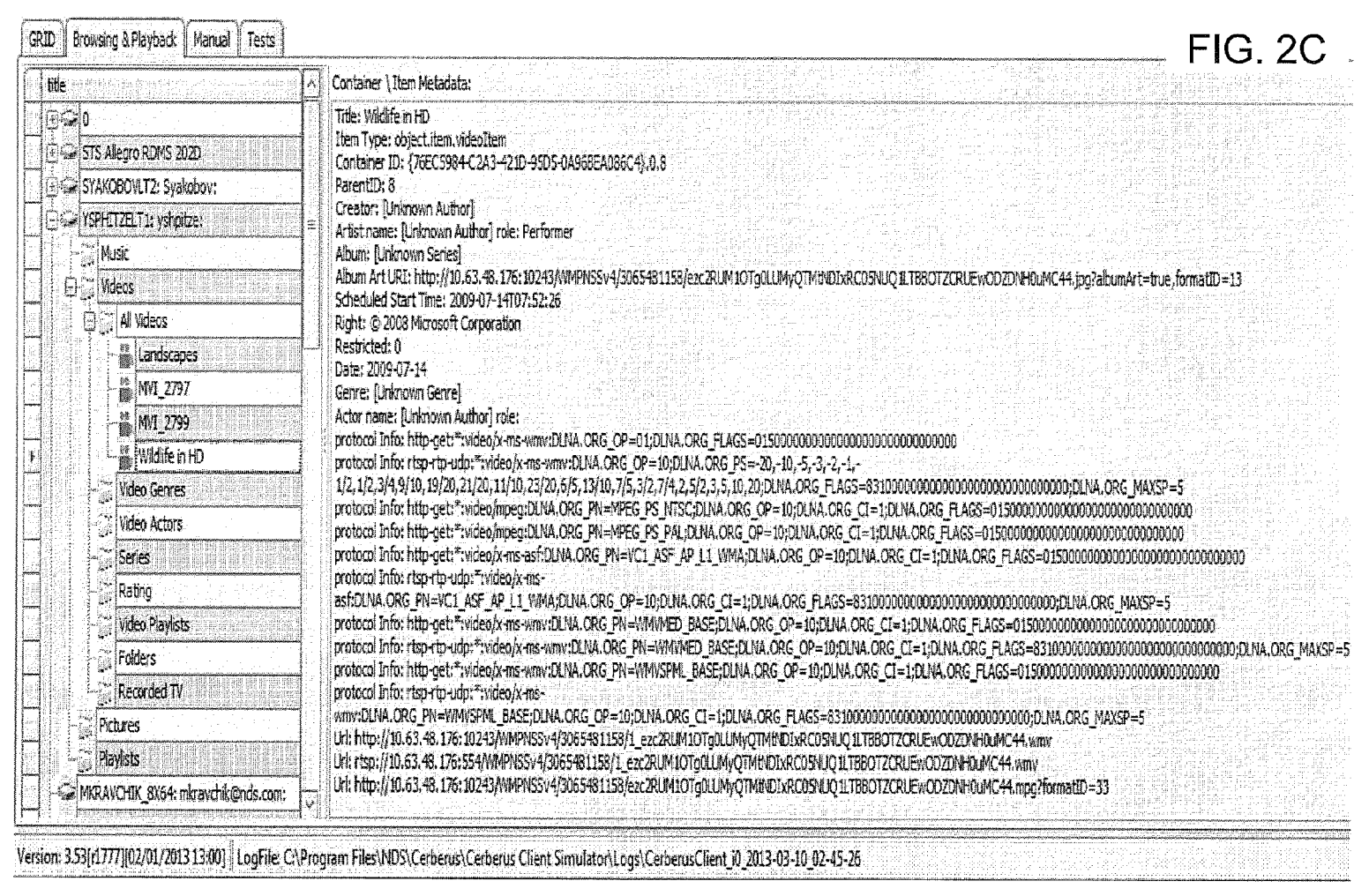

VCDS DMP 105 is configured with a user interface (not shown) to enable a user to request VCDS 220 to provide a display of one or more properties of the content located on content storage 230. As discussed hereinabove, VCDS 220 may be configured to provide metadata propertiers as per normally available from a given DMS 210. Reference is now made to FIGS. 2A, 2B and 2C which illustrate exemplary property detail displays that may be generated by VCDS DMP 105 as contemplated in some embodiments of the present invention based on the information in VCDS 220 in emulation of common CDS displays. FIG. 2A illustrates an exemplary display emulating a Twonky Server display; FIG. 2B illustrates an exemplary display emulating an Allegro Video display; and FIG. 2C illustrates an exemplary display emulating a Microsoft Media Center display.

Figure 2D:
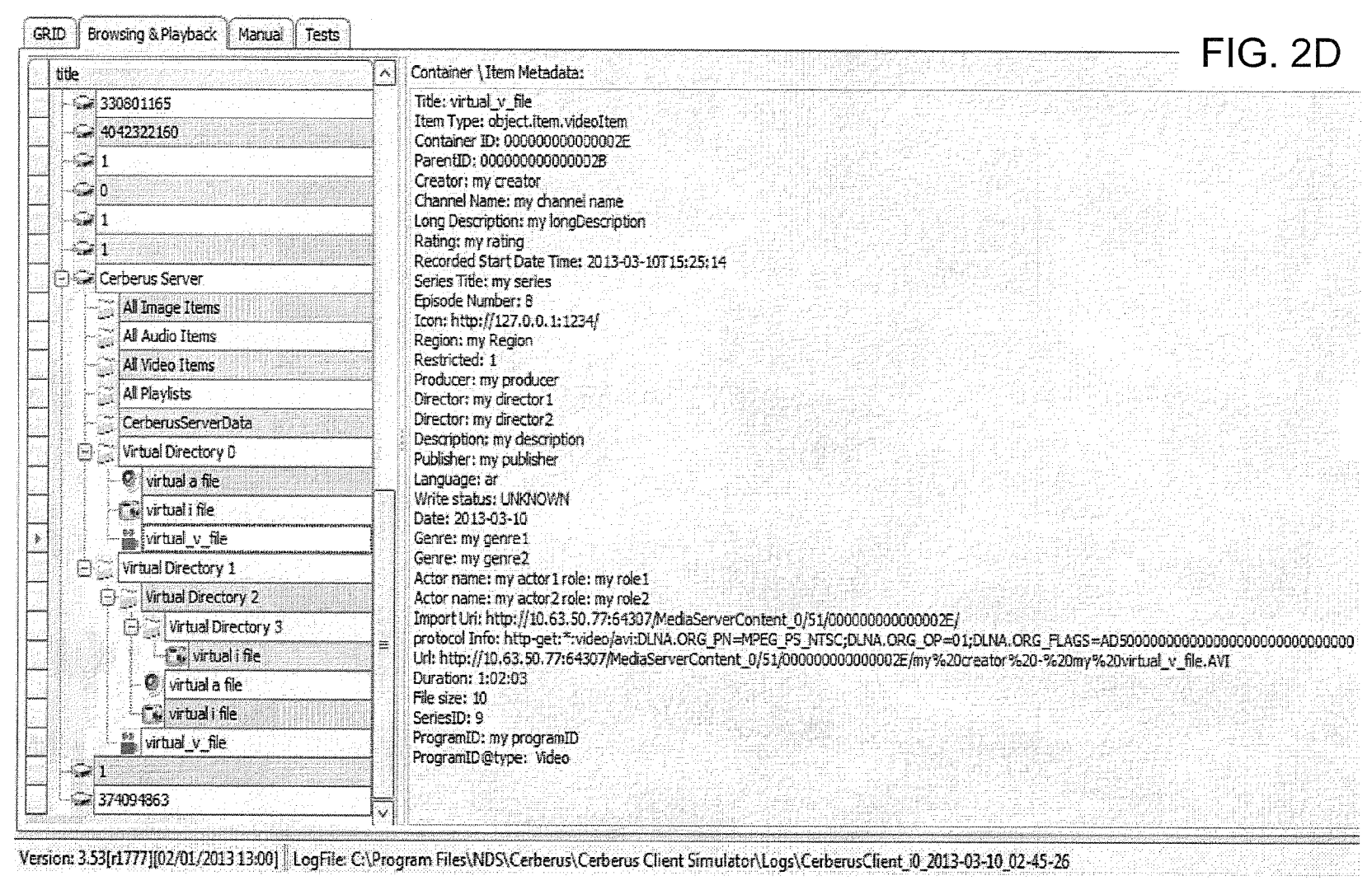

It will be appreciated that VCDS 220 may support other emulations depending on its configuration. For example, VCDS 220 may also be configured to provide a horizontally integrated superset of metadata properties, including a combination of the details available from two or more commercially available CDSs. FIG. 2D, to which reference is now made, illustrates an exemplary horizontally integrated video detail display, presenting properties normally associated with multiple commercially available CDSs.

Figure 2E:
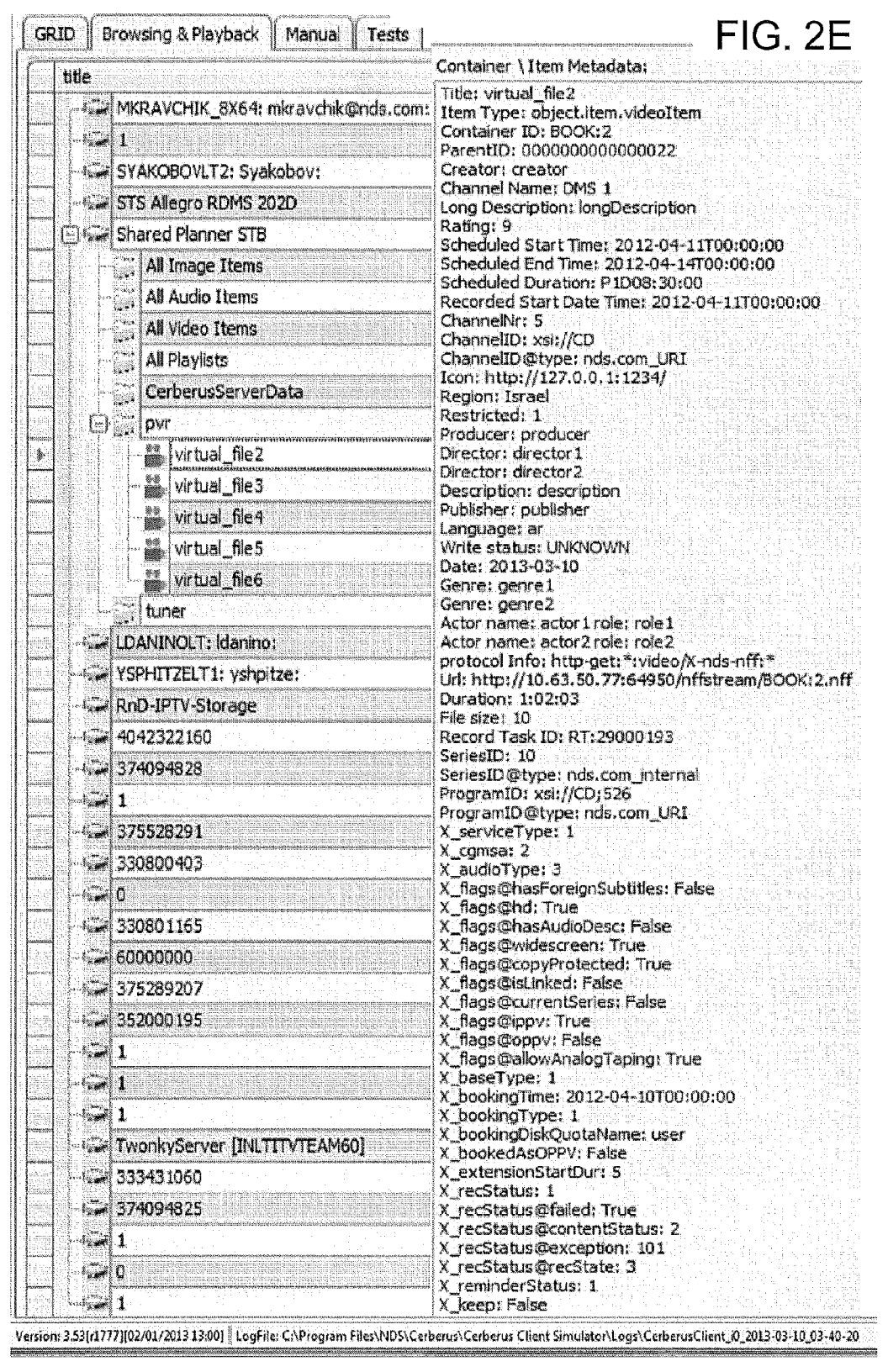

VCDS 220 may also be configurable to support the definition and presentation of content metadata properties that are not supported by other existing CDSs. In such manner, VCDS 220 may support the entry of user defined metadata properties and/or metadata properties required for vertical integration of functionality that may not be addressed by other commercially available CDSs. For example, a media content vendor may require additional metadata properties for digital rights management (DRM). FIG. 2E, to which reference is now made, illustrates a display supporting such vertical integration. The properties with an "X_" prefix may be added to support integration of other functionality, e.g. DRM.

VCDS 220 may be implemented using DLNA CDS guidelines for sharing different types of content between devices in a home network. Optionally, VCDS 220 may be configured with means for detecting the addition of new content to content storage 230. For example, a file system watcher function such as file system monitor 222 may be employed to detect file changes in content storage 230, thus triggering either autonomous or interactive editing by a user of related metadata properties in database 229. It will be appreciated that as disclosed hereinabove, virtual property updater 225 may be configured with a UI to enable a user to manually edit the contents of database 229.

Figure 3:
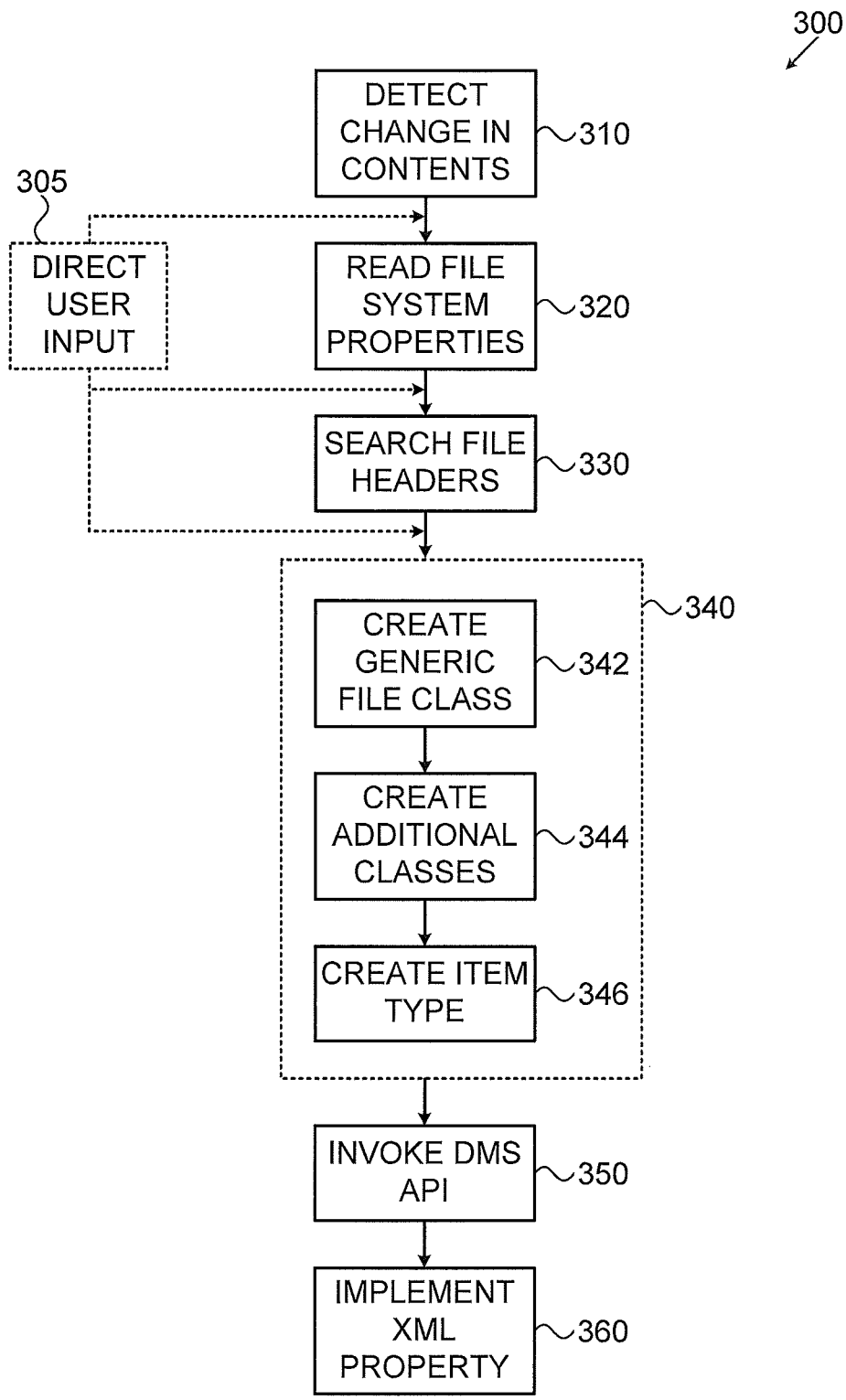
FIG. 3 is a block diagram of a VCDS metadata property update process, constructed and operative in accordance embodiments of the present invention.

Reference is now made to FIG. 3 which illustrates VCDS metadata property update process 300, constructed and operative in accordance embodiments of the present invention.

Process 300 may begin by file system monitor 222 detecting (step 310) a change in the contents of content storage 230, typically when a new media content file is added to content storage 230. File system monitor 222 may read (step 320) the file's common file system properties such as, for example, Length, CreationTime, and Title. File system monitor 222 may also search (step 330) the file's headers to find additional metadata properties such as, for example, seriesID, episode and actors. Optionally, some or all of steps 310-330 may be replaced by direct user input (step 305). Virtual property updater 225 generates (step 340) new entries in database 229 to represent the properties of the media content file.

Step 340 may comprise the following sub-steps:

Virtual propertyupdater 225 creates (step 342) a GenericFile class containing common file system properties such as, for example, those read in step 320.

Virtual propertyupdater 225 may then create (step 344) three additional classes, each of which may inherit from GenericFile: Video, Audio and Photo. It will be appreciated that together, these three classes may be suitable for implementing the related CDS metadata defined for its item type as per DLNA guidelines and/or by a vendor as relevant.

Accordingly, VCDS 220 may now be set up for a user to use virtual property updater 225 to create (step 346) any item type by calling these three classes' contractors.

VCDS 220 may then invoke (step 350) a DMS API to add the new content item's properties to CDS sharing. For example, SRVR_AddVirtualAudioFile(AudioItemData file, string directoryName) may be used for audio properties; SRVR_AddVirtualPhotoFile(PhotatemData file, string directoryName) may be used for photo properties; and/or SRVR_AddVirtualVideoFile(VideoItemData file, string directoryName) may be used for video properties.

VCDS 220 may also translate (step 360) each class property to a DLNA xml based property for CDS representation. For example: DateTime creationTime→<dc:date>.

VCDS 220 may then enable sharing of the content item, either autonomously, or in response to user initiation. A user SDK (software development kit) API may be used for creating and sharing virtual CDS items, i.e.: video, audio, photo having full control on metadata properties.

It will be appreciated that some or all the steps of process 300 may be performed by a user via an interactive user interface. It will similarly be appreciated, that at least some of the steps may be performed autonomously by VCDS 220 without necessarily requiring direct user intervention. For example, step 310 may be performed autonomously without user input by file system monitor 222. Steps 320 and/or 330 may also be performed autonomously without user input by virtual property updater 229. Any or all of the component sub-steps of step 340 may typically be performed as wholly autonomous processes, or alternatively as autonomous processes subject to user confirmation. Steps 350 and/or 360 may also be performed autonomously by VCDS 220 without user intervention. Likewise, VCDS 220 may be configured to require user action or at least request user confirmation in order to perform one or both of these steps.

It will also be appreciated that the processes described herein may be implemented independent of specific hardware and/or file system; process 300 may be implemented as a pure software solution.

It will further be appreciated that VCDS 220 facilitates home network features such as browsing, searching, sharing of tuners and/or planner items. These features may be concerned with metadata properties without being directly related with real content streaming which may not necessarily be relevant for such functionality. The invention may therefore provide a pure software solution for these features without using file system resources.

Figure 4:
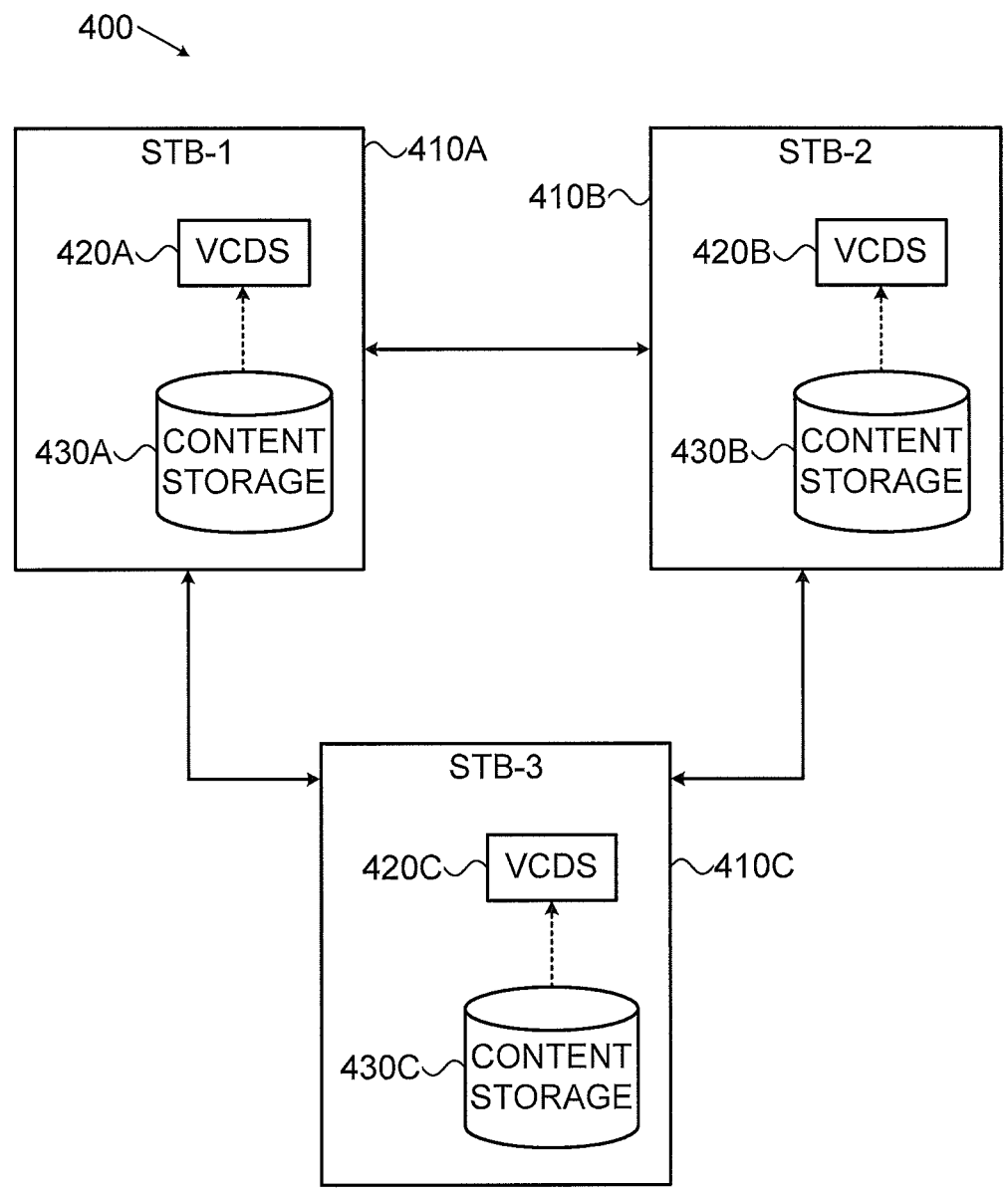
FIG. 4 is a simplified pictorial illustration of an exemplary configuration of a virtual CDS system, constructed and operative in accordance with an embodiment of the present invention.

Reference is now made to FIG. 4 which illustrates an exemplary configuration of a virtual CDS system 400. System 400 comprises a multiplicity of set-top boxes 410 that, similar to STB 100 (FIG. 1), are configured to provide television programming content for display on display devices. It will be appreciated that the depiction of three STBs 410 may be exemplary; as will be appreciated by a person versed in the art, system 400 may be configured to support different numbers of STBs 410.

Each STB 410 comprises VCDS 420 and content storage 430. VCDS 420 may comprise the same general functionality as VCDS 220 (FIG. 1), and content storage 430 may be configured similarly to content storage 230. Accordingly, as disclosed hereinabove, each VCDS 420 may provide virtual CDS for its associated content storage 430.

Typically, although not necessarily, each of the STBs 410 in system 400 may be connected to each other within the framework of a home network environment or other private network environment. It will be appreciated that in such circumstances it may be beneficial for the user of one STB 410, for example, STB 410A, to browse the media stored on another STB 410, for example, STB 410B. However, it may be impractical or at least tedious for STB 410A to browse the contents of content storage 430B by attempting to read the metadata from all of the relevant contents over a home network. There may be thousands of content items in content storage 430B, which may render real time reading of the relevant metadata impractically slow or at least cumbersome for other users of the network. For typical home use, this may not present a problem, as the relevant metadata may be read and cached over time as each item of content is stored on a given STB 410. However, it may be problematic when connecting two (or more) previously non-connected STBs 410 via a home network. It may be similarly problematic when setting up a test environment for development purposes.

VCDS 420 may be configured to accumulate and store metadata properties for content items stored on other STBs 410. For example, in addition to metadata properties related to content items in content storage 430A, VCDS 420A may also store metadata properties associated with content items from content storages 430B and 430C. VCDS 420B may similarly store metadata properties associated with content items from content storages 430A and 430C, and VCDS 420C may store metadata properties associated with content items from content storages 430A and 430B.

It will be appreciated that VCDS 420 for a given STB 410 may be updated with the metadata for another STB 410 via an autonomous process when the STB 410s are connected on the same network. For example, VCDS 420 may be configured with a notifier function that may send an update signal to other connected STBs 410 whenever the contents of metadata properties in database 229 (FIG. 1) are modified. Alternatively, the notifier process may be initiated manually and/or whenever VCDS 420 becomes aware that another VCDS 420 has connected to the same network. The notifier function may also be configured to execute on a programmably periodic basis, i.e. on startup, every hour, every four hours, etc.

Accordingly, a user of a given STB 410, for example, STB 410C, may browse a content listing for one or more other STB 410s on the same network, for example, STB 410B, without having to actually read the associated metadata on the other STB 410. Whereas, when using existing commercially available CDSs, it may be necessary to access and read each content item on STB 410B before it may be used for a content listing on STB 410C.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method for providing DLNA compatible content directory service (CDS) on a media content server device, the method comprising:
    detecting changes in at least one content item in a content database, wherein said detecting comprises at least one of monitoring said content database with a file system monitor or receiving notification from a notifier function associated with said content database;
    in response to said detecting, updating a virtual properties database in accordance with said changes, wherein said updating comprises:
        in said virtual properties database, creating a file system properties class associated with said at least one content item,
        creating at least one additional class that inherits from said file system properties class, wherein said at least one additional class is at least one of an audio, video or photo class, and
        entering content item metadata properties into said virtual properties database according to said file system properties class and said at least one additional class, wherein each of said content item metadata properties is associated with said at least one content item stored in said content database;
    adding said associated content item to CDS sharing as a virtual content item defined by said entered content item metadata properties;
    in response to a user's request, displaying on a display device said virtual content item in a listing of content information based at least on said content item metadata properties, without accessing said content database;
    enabling said user to select said virtual content item from said listing; and
    playing said associated content item from said content database.

2. The method according to claim 1 wherein:
    said listing of content information is requested via a set-top box (STB); and
    said content database is on a companion device in communication with said STB.

3. The method according to claim 1 wherein
    said listing of content information is requested via a first STB; and
    said content database is on a second STB in communication with said first STB.

4. The method according to claim 1 wherein said entering is performed autonomously without user input.

5. The method according to claim 1 wherein said entering comprises enabling user input of said metadata properties.

6. The method according to claim 5 wherein said associated content item does not comprise said metadata properties entered via said user input.

7. The method according to claim 1 and wherein said updating is performed autonomously without user input.

8. The method according to claim 1 and also comprising:
    defining a superset of metadata properties to be used for said entering, wherein said superset of metadata properties comprises metadata properties supported by more than one commercially available CDS product.

9. The method according to claim 1 wherein said entering comprises:
    accessing a second said virtual properties database associated with a second said content database associated with a second said media content player device; and
    entering said content item metadata properties into said virtual properties database, wherein each of said entered content item metadata properties is associated with a said content item stored in said second content database.

10. A DLNA compatible content directory service (CDS) unit for a media content player device, the unit comprising:
    means for detecting changes in at least one content item in a content database, wherein said detecting comprises at least one of monitoring said content database with a file system monitor or receiving notification from a notifier function associated with said content database;

means for updating a virtual properties database in accordance with said changes, wherein said updating is in response to said detecting and comprises:
- in said virtual properties database, creating a file system properties class associated with said at least one content item,
- creating at least one additional class that inherits from said file system properties class, wherein said at least one additional class is at least one of an audio, video or photo class, and
- means for entering content item metadata properties into said virtual properties database according to said file system properties class and said at least one additional class, wherein each of said content item metadata properties is associated with said at least one content item stored in said content database;

means for adding said associated content item to CDS sharing as a virtual content item defined by said entered content item metadata properties;

means for enabling a user to display said virtual content item in a listing of content information based at least on said content item metadata properties, without accessing said content database;

means for enabling said user to select said virtual content item from said listing; and means for playing said associated content item from said content database.

11. The unit according to claim 10 wherein said means for entering comprise:
- means for accessing a second said virtual properties database associated with a second said content database associated with a second said media content player device; and
- means for entering said content item metadata properties into said virtual properties database, wherein each of said entered content item metadata properties is associated with a said content item stored in said second content database.

* * * * *